US011747859B2

United States Patent
Nirgudkar et al.

(10) Patent No.: US 11,747,859 B2
(45) Date of Patent: Sep. 5, 2023

(54) PERSONAL SAFETY HEADBAND

(71) Applicants: Shailesh Nirgudkar, Acton, MA (US); Sankalp Modi, Acton, MA (US)

(72) Inventors: Shailesh Nirgudkar, Acton, MA (US); Sankalp Modi, Acton, MA (US)

(73) Assignee: Shailesh Nirgudkar, Acton, MA (US)

( * ) Notice: Subject to any disclaimer, the term of this patent is extended or adjusted under 35 U.S.C. 154(b) by 27 days.

(21) Appl. No.: 17/691,064

(22) Filed: Mar. 9, 2022

(65) Prior Publication Data
US 2022/0301402 A1 Sep. 22, 2022

Related U.S. Application Data

(60) Provisional application No. 63/161,858, filed on Mar. 16, 2021.

(51) Int. Cl.
| | |
|---|---|
| *G06F 1/16* | (2006.01) |
| *G08B 13/196* | (2006.01) |
| *G08B 13/181* | (2006.01) |
| *A41D 20/00* | (2006.01) |
| *G06V 20/52* | (2022.01) |

(Continued)

(52) U.S. Cl.
CPC .............. *G06F 1/163* (2013.01); *A41D 20/00* (2013.01); *G01S 17/93* (2013.01); *G06K 7/10396* (2013.01); *G06Q 20/321* (2020.05); *G06V 20/53* (2022.01); *G08B 13/181* (2013.01);

(Continued)

(58) Field of Classification Search
CPC .. G06F 1/163; G06Q 20/321; G06K 7/10396; G08B 13/196; G08B 13/19626; G08B 13/181; G08B 13/19632; G06V 20/53; A41D 20/00; G01S 17/93
See application file for complete search history.

(56) References Cited

U.S. PATENT DOCUMENTS

| | | |
|---|---|---|
| 5,358,144 A | 10/1994 | Mock |
| 10,794,669 B1 | 10/2020 | Gersznowicz |

(Continued)

OTHER PUBLICATIONS

Mlost of the wearable safety devices like Birdie, GreatCall are a manually controlled systems. There is no automated tracking, timely alert / preventative mechanism included. If the device is snatched, or an alert cannot be activated manually, then there is no safety. The onus is entirely on the user of the device which does not help as there is no time to react in case of incidences.

(Continued)

*Primary Examiner* — Ricky Chin (57) ABSTRACT

Apparatus and method for proactively alerting the user of potential threats and taking preventive actions to deter the intruder. The apparatus tracks the rear surrounding of the user and automatically detects potential threats in the form of unwanted advances by the strangers by tracking the safety zone around the user. The apparatus then alerts the user and the intruder by giving audio and/or visual signals. The warning alert switches to an emergency alert should the intruder continue advancing towards the user. Law enforcement and user's contacts are automatically dialed as part of the emergency protocol. Such footage also gets recorded for use by the law enforcement agency. This is the first apparatus that does automatic real time monitoring and performs preventative actions.

20 Claims, 7 Drawing Sheets

(51) Int. Cl.
    *G01S 17/93*     (2020.01)
    *G06K 7/10*      (2006.01)
    *G06Q 20/32*     (2012.01)
(52) U.S. Cl.
    CPC ..... *G08B 13/196* (2013.01); *G08B 13/19626* (2013.01); *G08B 13/19632* (2013.01)

(56) References Cited

U.S. PATENT DOCUMENTS

| | | | | |
|---|---|---|---|---|
| 11,423,384 | B1* | 8/2022 | Philbrick | G06Q 10/10 |
| 11,550,360 | B1* | 1/2023 | Passe | H02J 7/0047 |
| 2008/0236195 | A1* | 10/2008 | Woebke | A44C 5/003 |
| | | | | 63/7 |
| 2013/0120106 | A1* | 5/2013 | Cauwels | A61B 5/14532 |
| | | | | 361/728 |
| 2014/0327540 | A1* | 11/2014 | Shin | G08B 21/0446 |
| | | | | 340/539.11 |
| 2017/0076140 | A1* | 3/2017 | Waniguchi | G06V 20/20 |
| 2017/0118854 | A1* | 4/2017 | Dumont | H01R 13/15 |
| 2017/0132120 | A1* | 5/2017 | Salameh | G06F 11/00 |
| 2017/0134922 | A1* | 5/2017 | Chiu | G06F 1/163 |
| 2017/0168555 | A1* | 6/2017 | Munoz | G06F 1/3265 |
| 2017/0229004 | A1* | 8/2017 | Shah | G08B 15/02 |
| 2017/0273050 | A1* | 9/2017 | Levak | G01N 15/1456 |
| 2017/0359456 | A1* | 12/2017 | Shrubsole | G06F 3/017 |
| 2018/0062691 | A1* | 3/2018 | Barnett, Jr. | G06F 3/167 |
| 2018/0108242 | A1* | 4/2018 | Wilkinson | G08B 31/00 |
| 2018/0249151 | A1* | 8/2018 | Freeman | G16H 30/40 |
| 2018/0357887 | A1* | 12/2018 | Geyer | G08B 21/0469 |
| 2019/0109932 | A1* | 4/2019 | Higgins | H04M 1/72424 |
| 2019/0132801 | A1* | 5/2019 | Kamath | H04L 63/101 |
| 2019/0175016 | A1* | 6/2019 | Coden | G16H 40/67 |
| 2019/0339528 | A1* | 11/2019 | Freeman | G09G 3/002 |
| 2019/0377381 | A1* | 12/2019 | Tuttle | H05K 5/03 |
| 2020/0124850 | A1* | 4/2020 | Smith | G06V 20/20 |
| 2020/0210127 | A1* | 7/2020 | Browy | H04B 7/155 |
| 2020/0410250 | A1* | 12/2020 | Miller | G06V 20/20 |
| 2021/0169417 | A1* | 6/2021 | Burton | A61B 5/4857 |
| 2021/0373676 | A1* | 12/2021 | Jorasch | A63F 13/213 |
| 2021/0389590 | A1* | 12/2021 | Freeman | G09G 5/377 |
| 2022/0301402 | A1* | 9/2022 | Nirgudkar | G08B 13/19626 |
| 2023/0032199 | A1* | 2/2023 | Bittner | A01C 21/00 |

OTHER PUBLICATIONS

Mace Alert 911' device provides a manually controlled 911 calling only. The limitations are same as described above.

S. Ahir and S. Kapadia and J. Chauhan and N. Sanghavi, The personal stun-a smart device for women's safety, International Conference on Smart City and Emerging Technology, 2018. The action is manual and is initiated by the user. There is no automatic tracking or control or alert mechanism in the system.

J. Patel and R. Hasan, Smart bracelets: Towards automating personnel safety using wearable smart jewelry, 15th IEEE Annual Consumer Communications and Networking Conference, 2018. The bracelet is mainly used indoors and depends on the vigorous movement of the wearer when the wearer is falling.

Y. Chung and S. Olsen and L. Wojcik and Z. Song and C. He and S. Adamson, Wireless safety personnel radio device for collision avoidance system of autonomous vehicles, IEEE Antennas and Propagation Society International Symposium 2001 Digest the farm workers are at risk of collision when autonomous vehicles are present in the farm. The device is used to avoid such collisions.

* cited by examiner

PERSONAL SAFETY HEADBAND

PERSONAL SAFETY HEADBAND

FIELD OF THE INVENTION

The present apparatus relates generally to a smart headband with lights, alarms, sensors and various other safety features. The present apparatus automatically monitors the space around the user giving friends and family of the user peace of mind.

BACKGROUND OF THE INVENTION

21st century is seen as a vast improvement as compared to the life centuries ago. Quality of life, technology, access to medicine amongst various other things have enhanced over these years. Unfortunately women's safety continues to be neglected even in the 21st century. Most women experience some form of sexual harassment or physical threat while on a trip or on their daily travels.

Attempting to solve the human tendency that creates such a problem would require a great psychology background and is an ongoing difficult issue. However, technology can help prevent such occurrences. The present apparatus is a safety headband that tracks, monitors, alerts and applies preventive measures to protect the individual.

BRIEF SUMMARY OF THE INVENTION

The present apparatus is a head band that wraps around the top of the user's head and offers various security features to protect the user from unwanted advances by strangers. The LCD display that can be attached optionally to the headband acts as a rear-view mirror, giving the user a visual of their surroundings. The present apparatus can also be wirelessly connected to an electronic device giving the headband remote control and more precise functionality.

DESCRIPTION OF THE PREFERRED EMBODIMENT

Figure 1:
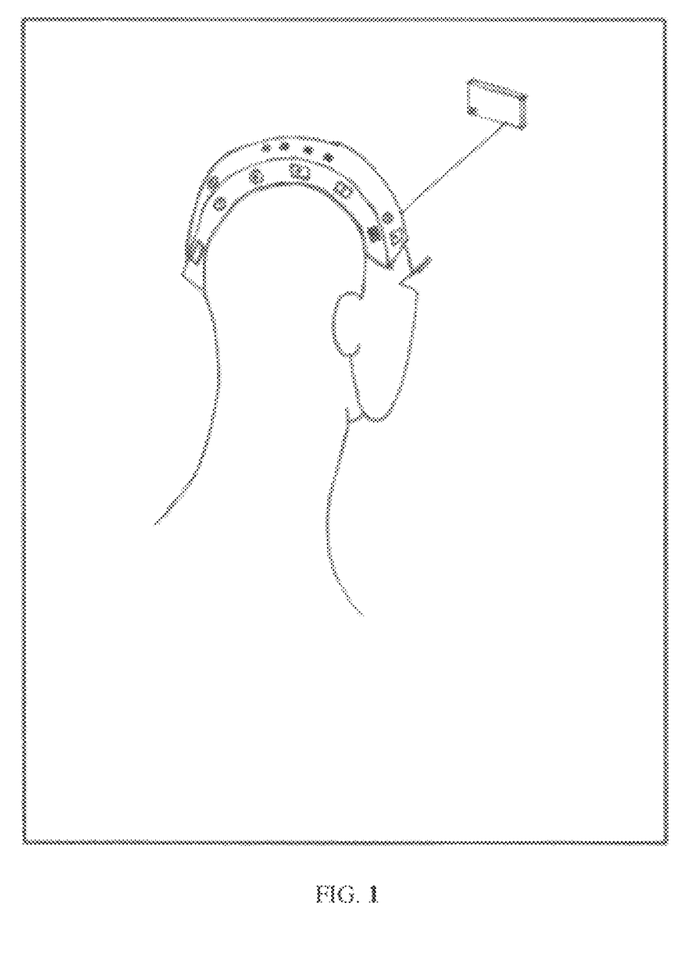
FIG. 1 is the schematic of the present apparatus
Figure 2:
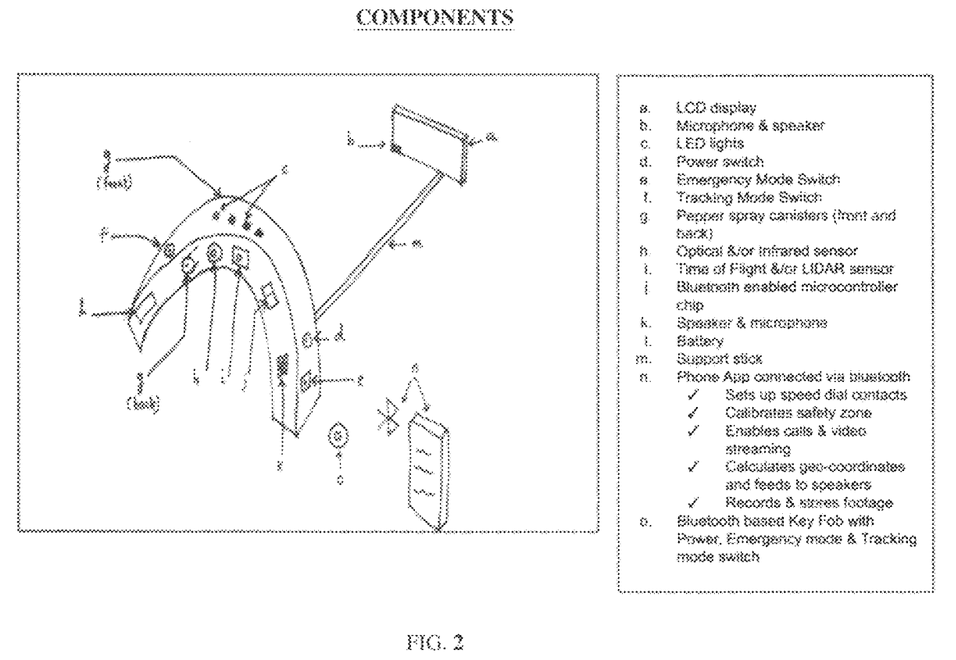
FIG. 2 is a perspective view of the present apparatus
Figure 3:
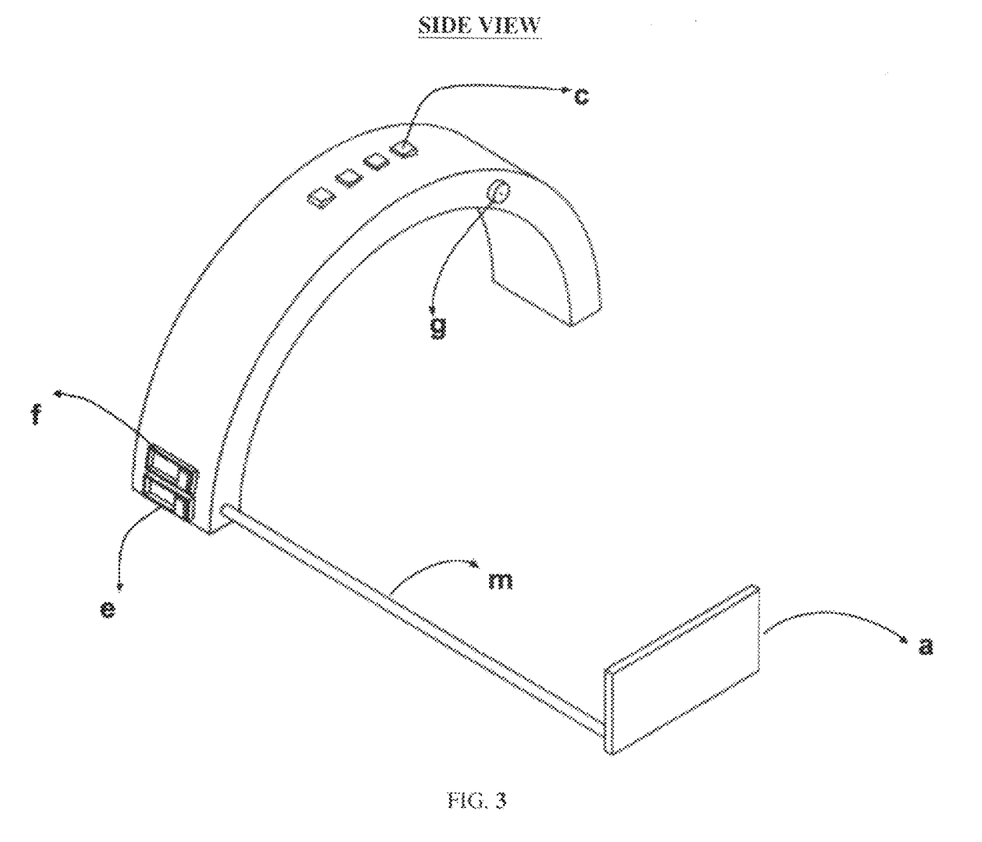
FIG. 3 is a rear view of the present apparatus
FIG. 4, FIG. 5.
Figure 4:
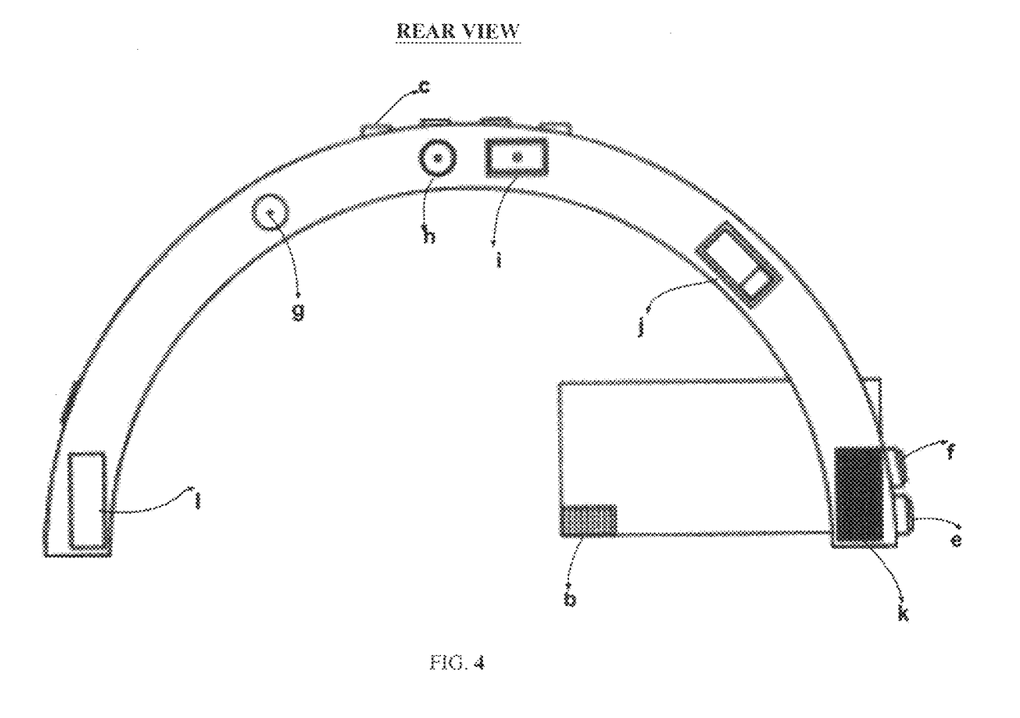
Figure 5:
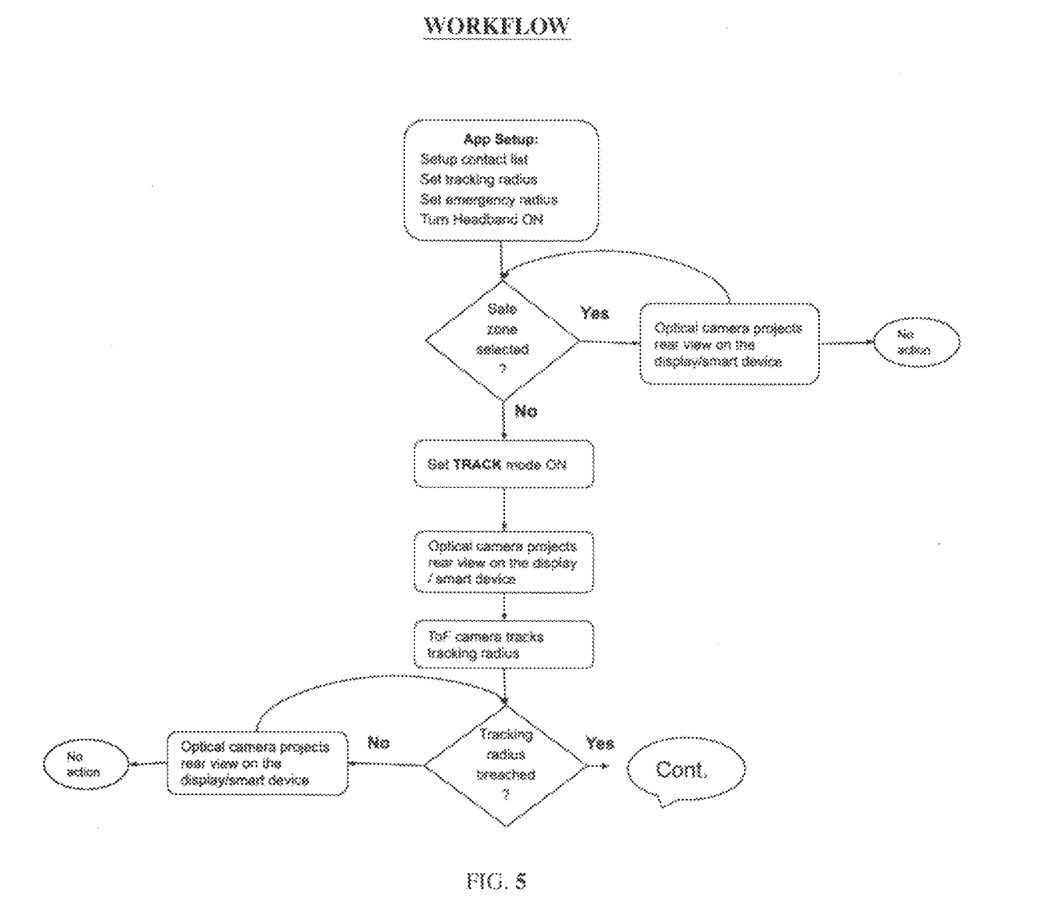
Figure 6:
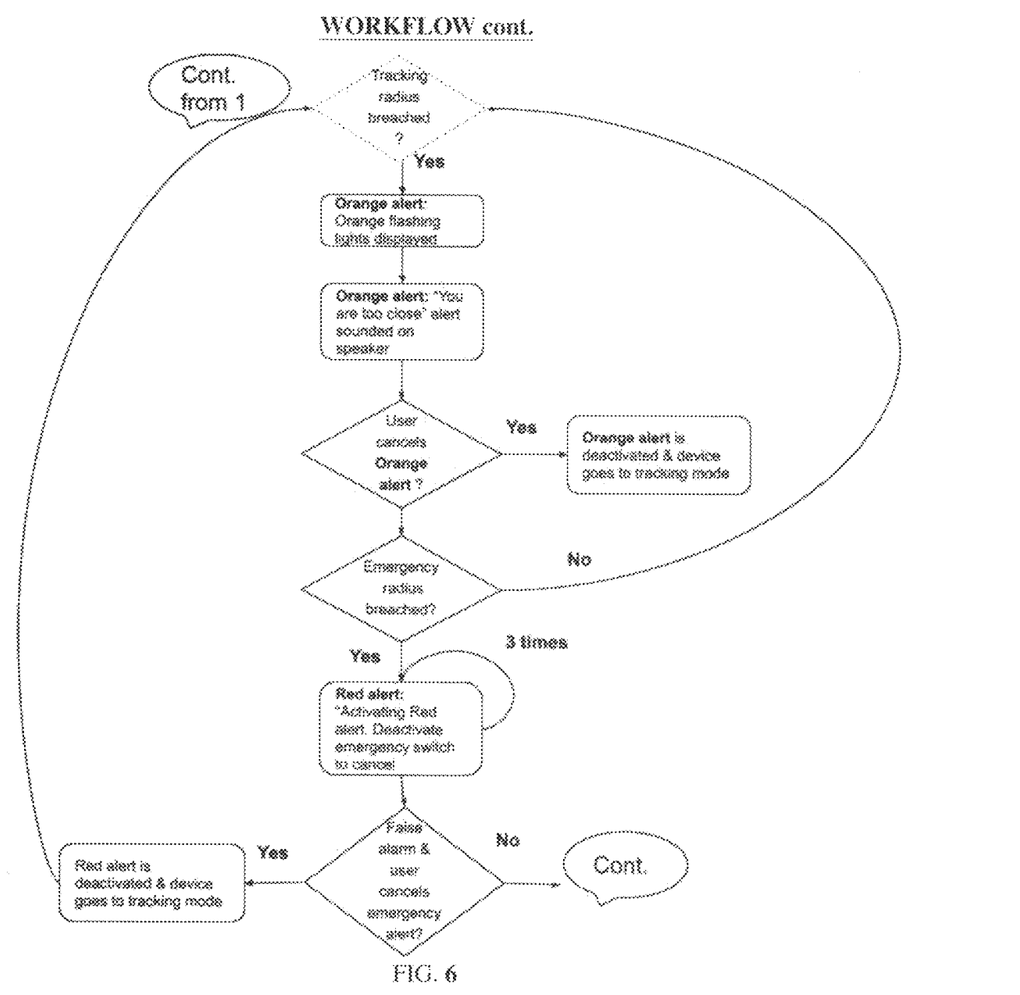
FIG. 6 is a workflow of the present apparatus
Figure 7:
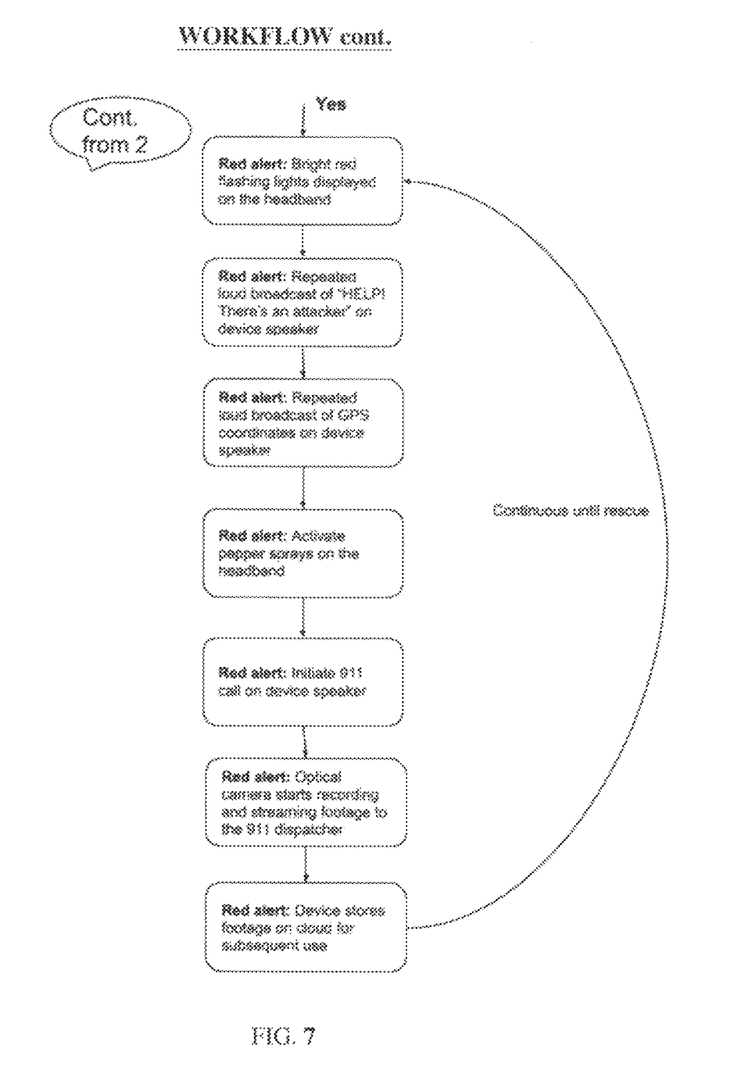

All illustrations of the drawings are for the purpose of describing selected versions of the present apparatus. FIGS. 1, 2 and 3 illustrate various components of the apparatus. The preferred embodiment of the personal safety headband comprises a headband, an optional display(a), a key fob(o), and a phone application(n). All of these components work in tandem with each other to create a safe environment when the present apparatus is in use.

The headband is designed with a semi-circular shape in order to be wrapped around the top of a head. As seen in FIG. 2, along the right front side of the headband the display(a) can be optionally attached via the support stick (m) to provide a visual of the surroundings around the present apparatus, especially the rear.

The key fob(o) is designed with a circular shape which has wireless capabilities, preferably Bluetooth, allowing backup control of the headband if dropped or taken. The phone application(n) is designed with wireless capabilities, preferably Bluetooth, which allows for greater customization and remote controlling of the present apparatus. The phone application(n) maintains the list of emergency contacts and also helps configure the safe and emergency zone radius for the user.

The headband in its preferred embodiment of the present apparatus is designed with a flexible material capable of molding to a desired shape. This type of material allows the headband to be placed on top of a head and bent to match the shape and stay secured in position.

The headband comprises of a plurality of LED lights(c), a plurality of switches(d,e,f), optional pepper spray vial(g), optical and/or infrared sensor sensor(h), a time-of-flight and/or LIDAR (LIght Detection and Ranging) sensor(i), a micro controller(j), a speaker and microphone(k), and a battery(l). The plurality of LED lights(c) is positioned on the top side of the headband as seen in FIG. 2 and have a variety of uses. The main function of the plurality of LED lights(c) is to be used during different alert modes when an unknown person enters the present apparatus' safety zone. When this occurs, the plurality of LED lights(c) will flash different colors based on the set mode in an effort to deter the intruder. The plurality of LED lights(c) can also be used to indicate whether the present apparatus is turned on or off. If the present apparatus is turned on, the plurality of LED lights(c) will turn green with a lower luminosity to indicate the present apparatus is working but with a different luminosity to avoid being confused with the alert modes.

In order to manually control the present apparatus, the headband comprises a plurality of switches(d,e,f) positioned on the right and left side of the headband. The plurality of switches comprise a power switch(d), an emergency mode switch(e), and a tracking mode switch(f). The power switch (d) is located on the right side of the present apparatus, with an on and off position. The power switch(d) allows the user to manually turn the present apparatus on and off, to ensure the present apparatus is not always running and using power when not in use.

The tracking mode switch(f) when enabled, tracks the surrounding area around the present apparatus. When the tracking mode switch(f) is turned on, a proximity area corresponding to safe zone is created around the present apparatus. When this area is intruded upon the apparatus activates orange alerts to deter the intruder.

If the intruder continues advances and breaches the proximity area corresponding to the emergency zone then the apparatus triggers the emergency mode if the emergency mode switch(e) located directly below the power switch(d) on the right side of the headband is enabled. The emergency mode switch(e) enables the emergency alert mechanism such as make direct calls to law enforcement agencies and contacts and can be turned on and off based on the various situations the present apparatus is in. For example, if the present apparatus is in a low-risk situation, such as a crowded area, the emergency mode switch(e) will be turned off in order to prevent accidental calls due to people in close proximity triggering the call that are not a present threat. The emergency mode switch(e) can be turned on for a high-risk situation, where it is dark and few people are around. The emergency mechanism will also broadcast on the speakers (k) loud alerts for help along with geo-coordinates to seek community assistance that may be in the proximity.

The headband in its preferred embodiment comprises a pepper spray vial(g) located on the top front and rear side. This component provides the present apparatus with an added level of security when in a high-risk situation. The pepper spray vial(g) can be set to be active in high-risk situations (emergency mode switch(e) is on) so that when the tracking area around the present apparatus is intruded upon by an unrecognized person, the pepper spray will be sprayed at the individual automatically.

The infrared sensor(h) helps to create a higher accuracy when identifying individuals in high-risk situations especially at night. The infrared sensor(h) is located on the top rear side of the headband to the right of the pepper spray vial(g) as seen in FIG. 3. The infrared sensor creates a clear visual of individuals behind the present apparatus and works in tandem with the time-of-flight and/or LIDAR sensor(i) to create a boundary around the present apparatus.

The time-of-flight and/or LIDAR sensor(i) is located on the top rear side of the headband to the right of the night vision camera(h). The time-of-flight and/or LIDAR sensor(i) is activated when the tracking mode switch is turned on and is used for measuring and calculating distance. This is useful in the various risk modes where a safety distance is set. For example, when the present apparatus is set to a 5-foot safety zone, if the time-of-flight and/or LIDAR sensor (i) detects an individual 6 feet away, then the alarm mode will not be triggered, unless that individual crosses that set safety zone.

The micro controller(j) is located on the rear right side of the present apparatus and governs the entire operation of the apparatus. Located below the micro controller(j) on the right rear side of headband is the microphone and speaker assembly(k). The assembly(k) is designed to allow the present apparatus to create an alarm noise that will deter an unknown intruder depending on the set mode. The assembly (k) will also allow for communication with the law enforcement dispatcher or other emergency contact if called. Located on the left rear side of the headband is the battery(l). The battery(l) when placed within the present apparatus allows for a portable power source to ensure that the present apparatus stays on and operating in all situations.

The next component of the present apparatus is the display(a). In the preferred embodiment of the present apparatus, the display(a) is located in front of the present apparatus as seen in FIG. 2. The display(a) transmits an image of what there is behind the present apparatus and can chose between either the optical sensor view or the infrared sensor view. The display(a) also serves as a user interface with the present apparatus showing various features that control different aspects of the present apparatus. Additionally, the display(a) has zoom functionality which will allow for the present apparatus to be able to identify faces when working in tandem with the artificial intelligence feature. This feature will be used in various scenarios where words will appear on the bottom of the display screen, such as "Someone is following you", when an unrecognized face appears around the present apparatus and a certain mode is set. The display(a) comprises a support stick(m) and a microphone and speaker assembly(b). The display stick(m) is located at the front right side of the headband and connects directly to the bottom of the display. The display stick(m) is permanently fixed to both components and serves to keep the display secure when the headband is moving around. The length of the display stick(m) can be adjusted. Though the present embodiment shows a certain arrangement of the display(a), the design can be made aesthetically pleasing such as keeping the display closer to the headband.

The microphone and speaker assembly(b) is located in the bottom right corner of the display(a) and allows communication when a law enforcement dispatcher is called or with emergency contacts. In the event that the emergency mode is triggered, the present apparatus will automatically start recording video and sound in order to capture the incident. This will serve as a firsthand account of the events and enable timely identification of the intruder.

The key fob(o) is also another important component of the present apparatus that can be carried along with the present apparatus but in a less obvious location, such as a pocket of an article of clothing. The key fob(o) will allow for an emergency call to be made in the event that the present apparatus is removed from the head. In addition to an emergency call, the key fob(o) is capable of changing the emergency mode and the tracking mode of the present apparatus with remote switches.

The present apparatus comprises a phone application(n) that can be connected wirelessly and preferably via Bluetooth. The phone application(n) works in tandem with the headband and the display components of the present apparatus. The phone application(n) creates a convenient interface that allows the present apparatus to be controlled remotely without any physical buttons or switches. One of the features of the phone application(n) is that it can set up speed dial contacts and familiar face contacts. This allows the present apparatus to directly call an emergency contact in addition to the enforcement agency in the event of a selected alarm mode being triggered. The familiar face contacts function will use artificial intelligence to recognize faces that surround the present apparatus, and if it is registered as a familiar face the present apparatus will not trigger and sound the alarm mode if that familiar individual intrudes into the safety zone. This helps reduce false alarms. The phone application(n) can also configure the different radii for the safety zones. The phone application(n) calculates the present apparatus' geo-coordinates and sends this information to the law enforcement dispatcher in the event of an alarm mode being triggered as well as being used to track the present apparatus if lost or stolen.

If the present apparatus is forcibly taken or an individual intrudes upon the safety zone, the present apparatus records the entire interaction and stores the footage on the phone application to be used later for evidence of an event. In the preferred embodiment of the phone application(n), the last main feature is that the phone application(n) allows the present apparatus to be controlled using voice commands. These voice commands will allow for the present apparatus to be controlled if it falls or is taken and cannot be reached physically. The voice commands will only work if it matches the voice already stored within the phone application using voice identification in order to ensure the present apparatus cannot be controlled by voice of an unregistered individual.

Working of the Preferred Embodiment

The present apparatus in its preferred embodiment is designed to be used in a variety of different situations ranging from low to high-risk scenarios. In a low-risk scenario the personal safety headband will always be turned on ensuring the user can use the display to keep track of the people surrounding the user.

Although the personal safety headband is turned on, both the tracking mode switch and the emergency mode switch will be turned off. This ensures that if a person infringes upon a certain distance a call to the law enforcement agency and other emergency protocols will not be triggered because the average personal space is much smaller when an individual is in a crowded area such as a major city street or transportation hub. The personal safety headband will constantly display the rear view on the front display, however this data will not be actively recorded or stored unless emergency protocol is activated.

In a scenario such as this, the personal safety headband will be able to utilize its artificial intelligence to provide extra safety to the user. For example, if the present apparatus recognizes the same face following the user for a prolonged period the display will show in large letters the words "You Are Being Followed" and identify the perpetrator. With additional safety in mind the present apparatus can utilize the plurality of LED lights to act as flashlights to increase visibility around the user in an instance where visibility is low.

The present apparatus is also equipped to handle a medium risk scenario where there are fewer people around, if the user is taking a walk in a suburban neighborhood, where it is not crowded but there are still some people around. In a scenario such as this, personal space will extend to a greater distance, and if someone starts to infringe on this it would bring up a larger cause for concern.

In this type of scenario, the present apparatus will be turned on as well as the tracking mode switch, however the emergency call switch will be turned off. Similar to the low-risk scenario the present apparatus will display people behind the user on the display and will not store this data. The time-of-flight or LIDAR sensor will be activated and actively track the distance between the user and any individual behind the user. With the distance for the safety zone preset by the user, once a person infringes upon this area the present apparatus can utilize the plurality of LED lights to flash a warning orange color. This in conjunction with an alert message coming from the speaker such as, "Please stay back" the perpetrator will potentially be deterred from coming any closer. Once the individual threat has retreated the user can then use the phone application or manually deactivate the plurality of LED lights with a recognized voice command. If an unrecognized voice tells the plurality of LED lights to deactivate the artificial intelligence will assume this is an unauthorized command and continue with the alert message.

The final main scenario the present apparatus will be used in is a high-risk scenario where the user is in the dark or is alone with very few people around, for example a run through the woods at dusk. The present apparatus will be always turned on along with the emergency mode switch and the tracking mode switch. If the intruder breaches the orange zone and enters the emergency zone, the red alert mode will be activated. The present apparatus will utilize the speaker to broadcast a message saying "Activating Red Alert Protocol. Deactivate Emergency switch to cancel" and will be repeated two more times. If the user uses the display and either recognizes the individual or believes it is a false alarm, they can use voice command to turn off the emergency mode switch. If they do not deactivate, the present apparatus will fully activate red alert mode.

Once red alert mode is activated the plurality of LED lights will intensely flash a bright red color in all directions, as well as broadcast a SOS over the speakers. In addition, the present apparatus will use the pepper spray to further try and deter the user. While these features are activated the present apparatus will initiate a call to the law enforcement agency allowing the microphone to talk to the dispatcher and send geo-coordinates to the dispatcher. Along with the call to the law enforcement agency, the present apparatus will begin recording and streaming the incident to the dispatcher and will store the footage on the phone application to be used as a proof later. Thus, the present apparatus will be used to deter unwanted individuals and aid the user in threatening situations.

Although the apparatus has been explained in relation to its preferred embodiment, it is to be understood that minor possible variations may be made without departing from the spirit and scope of the apparatus.

Embodiments of the apparatus may be implemented on a computing system. For example, a computing system may include one or more computer processors, non-persistent storage (e.g., volatile memory, such as random access memory (RAM), cache memory), persistent storage (e.g., a hard disk, an optical drive such as a compact disk (CD) drive or digital versatile disk (DVD) drive, a flash memory, etc.), a communication interface (e.g., Bluetooth interface, an infrared interface, network interface, optical interface, etc.), and numerous other elements and functionalities.

The computer processor(s) may be an integrated circuit for processing instructions. For example, the computer processor(s) may be one or more cores or micro-cores of a processor. The computing system may also include one or more input devices, such as a touchscreen, microphone, touchpad, electronic pen, or any other type of input device.

The communication interface may include an integrated circuit for connecting the computing system to a network (e.g., a local area network (LAN), a wide area network (WAN) such as the Internet, mobile network, or any other type of network) and/or to another device, such as another computing device.

Software instructions in the form of the computer-readable program code to perform embodiments of the apparatus may be stored, in whole or in part, temporarily or permanently, on a non-transitory computer-readable medium such as a CD, DVD, storage device, a diskette, a tape, flash memory, physical memory, or any other computer-readable storage medium. Specifically, the software instructions may correspond to computer-readable program code that, when executed by a processor(s), is configured to perform one or more embodiments of the apparatus.

What is claimed is:

1. An apparatus for real-time tracking, personalized alerts and preventive measures comprising:
    a headband;
    a plurality of sensors for detecting persons and objects surrounding the headband;
    a speaker;
    a microphone;
    a microprocessor; and
    LED lights;
    wherein the plurality of sensors, the speaker, the microphone, and the microprocessor are all mounted on or integrated on the headband, wherein the headband is wirelessly connected to a mobile phone application, wherein the microprocessor is configured to:
    monitor the surrounding of the headband using the plurality of the sensors, detect persons posing a potential threat to safety based on configurations on the mobile phone application, alert a user of the headband of the potential threat using the speaker, the LED light, or the mobile phone application, and allow emergency communications and preventative actions with law enforcement agencies and/or emergency contacts of the user of the headband; and interface with a key fob with a power switch, a tracking mode switch and an emergency mode switch connected to the mobile phone application.

2. The apparatus of claim 1, wherein the plurality of sensors include at least one of the following sensors: a camera, an Infrared sensor, a Light Detection and Ranging (LIDAR) sensor, a time of flight sensor, and a 3-D camera.

3. The apparatus of claim 1, wherein the microcontroller is enabled with WIFI, GPS and/or Bluetooth.

4. The apparatus of claim 1, wherein the mobile phone application configurations provide settings for a safe zone and an emergency zone.

5. The apparatus of claim 1, wherein the mobile phone application provides speed dial settings for personal contacts of the user.

6. The apparatus of claim 1, wherein the headband includes a tracking mode switch which controls enabling or disabling tracking of the surroundings of the headband.

7. The apparatus of claim 1, wherein the headband includes an emergency mode switch which controls enabling or disabling emergency communication and action.

8. The apparatus of claim 1, further comprising a display connected to the headband.

9. The apparatus of claim 8, wherein the display is connected to the headband using an extendable stick.

10. The apparatus of claim 1, further comprising pepper spray canisters mounted on the headband.

11. A method for monitoring surroundings of the apparatus of claim 1, comprising:
    detecting, using a plurality of sensors of the apparatus, surroundings of the apparatus to identify persons or objects posing a potential threat to safety based on images or signals from the apparatus;
    alerting users about the potential threat using the apparatus or a connected mobile phone application;
    allowing emergency communications to law enforcement agencies or emergency contacts of the users and taking preventative actions, wherein LED lights or a speaker mounted on or integrated with the apparatus are used to convey the potential threat to the users, wherein the speaker and the microphone in the apparatus is used for emergency communications and preventative actions.

12. The method of claim 11, wherein a warning alert is created only when a perceived threat is within a configurable safe zone distance.

13. The method of claim 11, wherein emergency communications and preventative actions are only initiated when any perceived threat is within a configurable emergency zone distance.

14. The method of claim 11, wherein alert or emergency actions are manually overridable using a switch in the apparatus.

15. The method of claim 11, wherein the apparatus or mobile phone application can perform facial recognition to compare a face of an intruder against images stored in the phone application contacts to avoid false positives.

16. The method of claim 11, wherein one of the preventative actions is a verbal warning issued to a potential intruder using a speaker.

17. The method of claim 16, comprising an emergency protocol, that initiates calling to at least one law enforcement agency if the intruder is still present in a configurable emergency zone after issuing a warning.

18. The method of claim 17, comprising of loud acoustic alerts, bright visual alerts and video recording of footage as part of the emergency protocol.

19. The method of claim 18, comprising of speed dialing contacts for seeking help.

20. An apparatus for real-time tracking, personalized alerts and preventive measures comprising:
    a headband;
    a plurality of sensors for detecting persons and objects surrounding the headband;
    a speaker;
    a microphone;
    a microprocessor; and
    LED lights;
    wherein the plurality of sensors, the speaker, the microphone, and the microprocessor are all mounted on or integrated on the headband, wherein the headband is wirelessly connected to a mobile phone application, wherein the microprocessor is configured to:
    monitor the surrounding of the headband using the plurality of the sensors, detect persons posing a potential threat to safety based on configurations on the mobile phone application, alert a user of the headband of the potential threat using the speaker, the LED light, or the mobile phone application, and allow emergency communications and preventative actions with law enforcement agencies and/or emergency contacts of the user of the headband; and further comprising a display connected to the headband using an extendable stick.

* * * * *